United States Patent
Pai et al.

(10) Patent No.: US 10,221,946 B1
(45) Date of Patent: Mar. 5, 2019

(54) SECURITY FASTENER

(71) Applicant: Ford Global Technologies, LLC, Dearborn, MI (US)

(72) Inventors: Mihir M. Pai, Livonia, MI (US); Todd Curtis Spaulding, Ann Arbor, MI (US); Cecil Michael Pais, Farmington Hills, MI (US); Brian J. Deurloo, Howell, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/696,893

(22) Filed: Sep. 6, 2017

(51) Int. Cl.
  *F16B 23/00* (2006.01)
  *F16H 63/34* (2006.01)
  *G05G 5/08* (2006.01)

(52) U.S. Cl.
  CPC ....... *F16H 63/3491* (2013.01); *F16B 23/003* (2013.01); *F16H 63/3425* (2013.01); *G05G 5/08* (2013.01); *G05G 2505/00* (2013.01)

(58) Field of Classification Search
  CPC .... F16B 23/00; F16B 23/0007; F16B 23/003; F16B 23/0069; F16B 23/0076; F16B 23/0092
  USPC .......................... 411/394, 402, 403, 410, 911
  See application file for complete search history.

(56) References Cited

U.S. PATENT DOCUMENTS

| | | | |
|---|---|---|---|
| 3,127,919 A | 4/1964 | Swanstrom | |
| 3,134,292 A * | 5/1964 | Walton | F16B 23/0076 411/403 |
| 3,302,672 A * | 2/1967 | Walton | B25B 15/004 411/403 |
| 3,363,500 A | 1/1968 | Simko | |
| 3,411,396 A * | 11/1968 | Herpich | F16B 23/0007 411/410 |
| 3,658,105 A | 4/1972 | Burt et al. | |
| 3,673,912 A | 7/1972 | Herr | |
| 3,929,152 A * | 12/1975 | Graham | E03B 9/02 137/296 |
| 5,018,921 A * | 5/1991 | Pinney | F16B 7/0446 403/297 |
| 5,171,117 A | 12/1992 | Seidl | |
| 5,269,208 A | 12/1993 | Kolvites et al. | |
| 5,340,256 A * | 8/1994 | Morgan | B25B 13/065 411/405 |
| 5,358,368 A | 10/1994 | Conlan et al. | |
| 5,378,101 A | 1/1995 | Olson et al. | |
| 5,449,260 A | 9/1995 | Whittle | |
| 5,598,753 A | 2/1997 | Lee | |
| 5,647,712 A | 7/1997 | Demirdogen et al. | |
| 5,957,645 A | 9/1999 | Stacy | |
| 6,234,914 B1 | 5/2001 | Stacy | |
| 6,367,358 B1 | 4/2002 | Stacy | |

(Continued)

*Primary Examiner* — Roberta S Delisle
(74) *Attorney, Agent, or Firm* — Brooks Kushman P.C.

(57) ABSTRACT

A fastener having a head is provided. The fastener includes a unidirectional inner drive including an inner lobe having an inner ramp surface adjacent to an inner drive abutment surface adapted to receive a torque to effect a clockwise rotation of the fastener. The fastener further includes a concentric unidirectional outer drive including an outer lobe having an outer ramp surface adjacent to an outer drive abutment surface adapted to receive an inverse torque to effect a counter-clockwise rotation of the fastener.

16 Claims, 3 Drawing Sheets

(56) References Cited

U.S. PATENT DOCUMENTS

| | | | |
|---|---|---|---|
| 6,685,412 B2* | 2/2004 | Altarac | B25B 15/005 |
| | | | 411/403 |
| 6,752,049 B1 | 6/2004 | White | |
| 7,156,598 B2 | 1/2007 | Tibbenham et al. | |
| 7,255,522 B2 | 8/2007 | Dilling | |
| 7,618,327 B2 | 11/2009 | Dilling | |
| 8,182,187 B2 | 5/2012 | Siong | |
| 8,690,504 B2* | 4/2014 | Huss, Jr. | F16B 31/027 |
| | | | 411/1 |
| 8,777,969 B2 | 7/2014 | Kayan | |
| 9,091,291 B2 | 7/2015 | Andrade De Souza et al. | |
| D776,513 S | 1/2017 | Mateko | |
| 2003/0002952 A1* | 1/2003 | Totsu | B21K 1/46 |
| | | | 411/403 |
| 2005/0244248 A1* | 11/2005 | Avganim | B25B 15/005 |
| | | | 411/410 |
| 2006/0086214 A1 | 4/2006 | Smed | |
| 2008/0145181 A1* | 6/2008 | Lynes | B25B 13/065 |
| | | | 411/403 |
| 2012/0057949 A1* | 3/2012 | Canizares, Jr. | A61B 17/862 |
| | | | 411/410 |
| 2015/0308571 A1 | 10/2015 | Wyatt et al. | |

\* cited by examiner

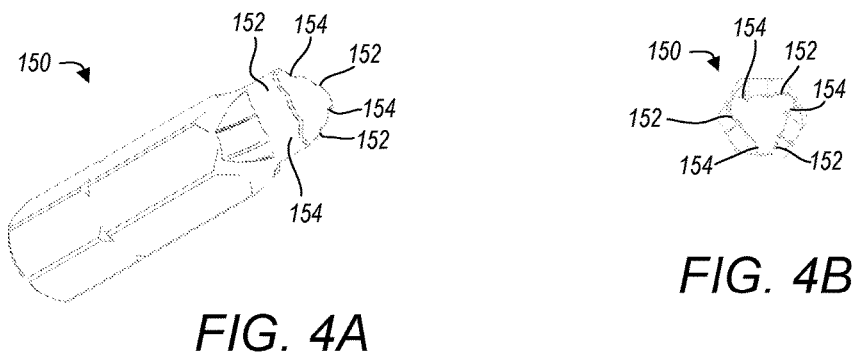
FIG. 4A
FIG. 4B
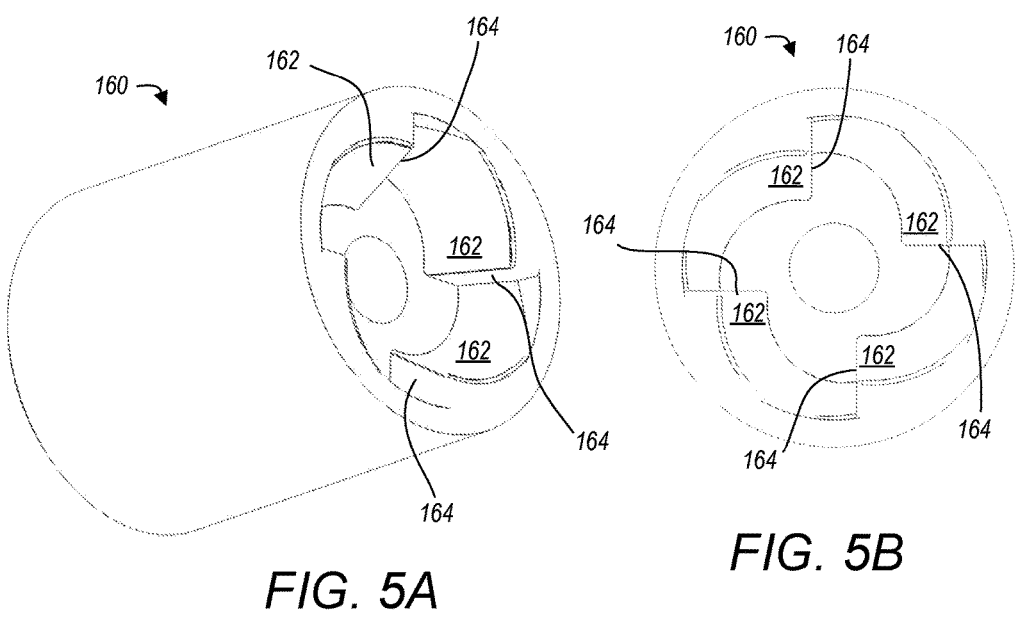
FIG. 5A
FIG. 5B

SECURITY FASTENER

TECHNICAL FIELD

The present disclosure relates to a security fastener, and more particularly, to a security fastener having an inner unidirectional drive and an inverse outer unidirectional drive.

BACKGROUND

A fastener is disclosed in U.S. Pat. No. 7,156,598.

SUMMARY

In at least one approach, a fastener having a head is provided. The fastener may include a unidirectional inner drive including an inner lobe having an inner ramp surface adjacent to an inner drive abutment surface adapted to receive a torque to effect a clockwise rotation of the fastener. The fastener may further include a concentric unidirectional outer drive including an outer lobe having an outer ramp surface adjacent to an outer drive abutment surface adapted to receive an inverse torque to effect a counter-clockwise rotation of the fastener.

BRIEF DESCRIPTION OF THE DRAWINGS

FIG. 4A is a perspective view of an inner drive tool.

FIG. 4B is a top plan view of the inner drive tool of FIG. 4A.

FIG. 5A is a perspective view of an outer drive tool.

FIG. 5B is a top plan view of the outer drive tool of FIG. 5A.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

A traditional automatic transmission may include a transmission control device employed to control the transmission of a motor vehicle. The transmission control device may be used to select several ranges, such as Park, wherein the transmission is locked to prevent the vehicle from moving, Neutral, wherein the transmission allows the vehicle to be moved freely, such as when being towed, Reverse, wherein the transmission allows the vehicle to move backwards, and one or more Drive ranges that enable forward motion of the vehicle. The transmission control device may be in the form of a lever connected to the transmission via a mechanical connection, such as a cable.

Figure 1:
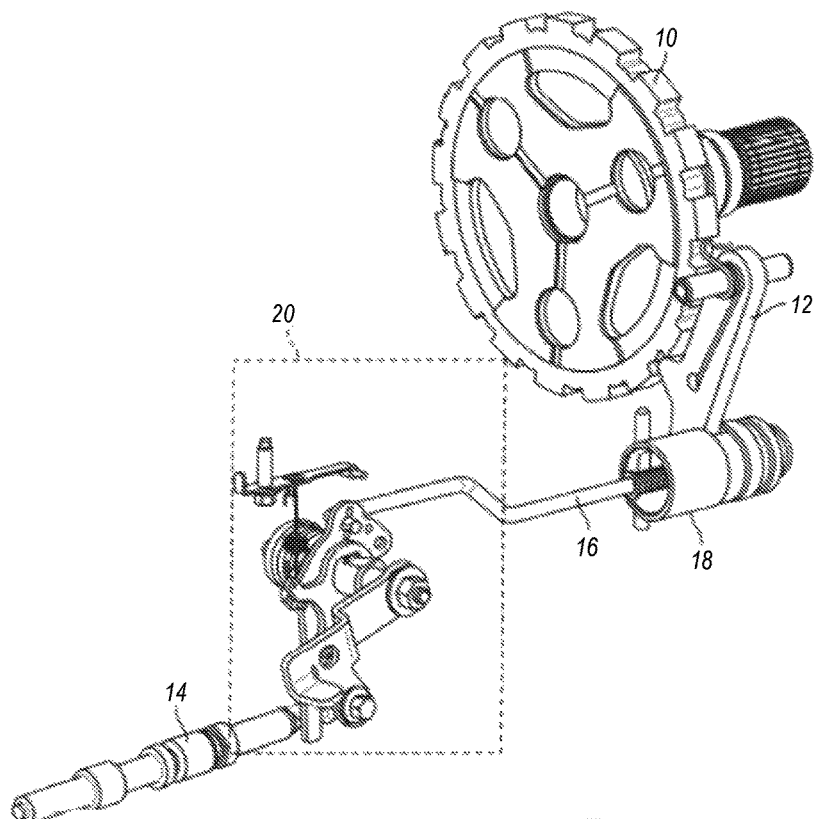
FIG. 1 is a perspective view of a portion of a parking assembly for a shift-by-wire transmission including a parking override system.

Referring now to FIG. 1, a portion of a parking assembly for a shift-by-wire transmission is shown. A shift-by-wire or park-by-wire transmission may refer to an arrangement having no mechanical connection between a transmission control device and the transmission. Instead, a gear shift module transmits an electrical signal to an electronic controller, which directs separate actuators to apply or release the various friction elements, such as clutches or brakes, to obtain a desired gear ratio.

The transmission may include at least one gear 10 and a parking pawl 12 that may be selectively engageable with the gear 10. The parking pawl 12 may engage with the gear 10 to inhibit vehicle motion or release from the gear 10 to permit vehicle motion. An actuator 14 may engage and/or disengage the parking pawl 12 via a link arm 16 and linkage 18. In some approaches, the parking pawl 12 may be engaged in response to a driver shifting the transmission to PARK. In other approaches, the parking pawl 12 may be engaged in response to loss of power to the vehicle. Various other parking elements may also be used to inhibit vehicle motion.

The actuator 14 may be, for example, a hydraulic actuator. Under normal vehicle operation, an engine may drive a transmission pump to supply hydraulic pressure to a hydraulic actuator and enable application or release of the parking pawl 12. Because there may not be a mechanical connection between the gear shift module and the transmission, in the absence of hydraulic pressure to the actuator 14, a driver in some circumstances may not be unable to shift the transmission between gears. When the engine is off, the gear shift module may not be usable to shift gears.

Under some circumstances, it may be desirable to shift the vehicle out of PARK (e.g., to another gear) without the engine running. For example, if the engine is inoperable, it may be desirable to shift the transmission out of PARK to facilitate towing. As an additional example, it may be desirable to roll the vehicle to a new location without running the engine. As such, a transmission may be provided with a manual parking override assembly 20. The parking override assembly 20 may include an override device, such as an override lever, that may release the parking pawl 12, thereby allowing the transmission (and thus, the vehicle) to move.

Figure 2:
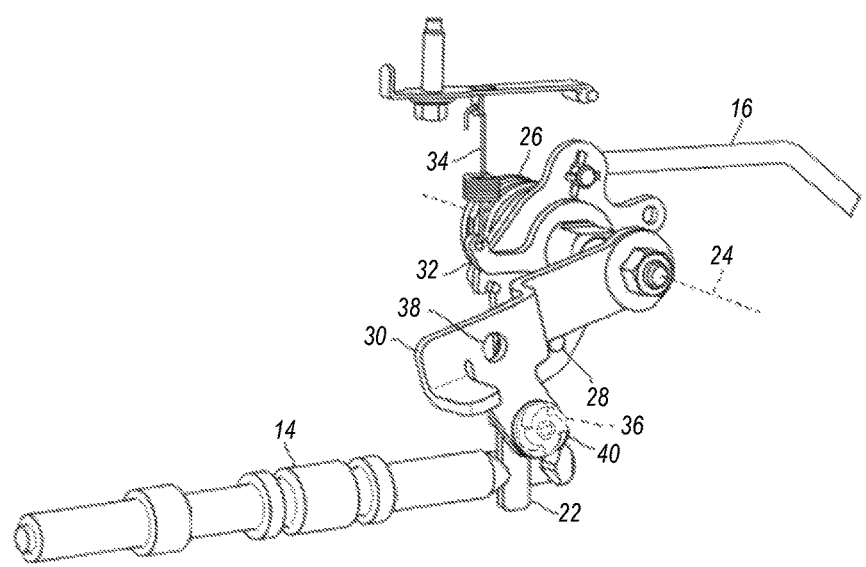
FIG. 2 is a perspective view of a portion of the parking override system of FIG. 1.

Referring now to FIG. 2, an actuator 14 may be drivably coupled with an inner lever 22. The inner lever 22 may be, at an opposite end, drivably connected to a link arm 16. The inner lever 22 may be movable between various positions, including a first position, which may be a "PARK" position in which a parking pawl is engaged with a gear of a transmission, and a second position, which may be a "not PARK" position in which a parking pawl is disengaged from a gear of a transmission. The inner lever 22 may be configured to pivot about a pivot axis 24 among the various positions. A torsion spring 26 may be configured to apply a biasing torque to the inner lever 22. In a one approach, the torsion spring 26 is configured to apply a biasing torque toward the PARK position. Such an assembly may be referred to as having a "return to PARK" function. The inner lever additionally may include a pin 28 extending from a face opposite the torsion spring 26. It should be noted that in this context, "inner" refers to the positioning of the lever relative to a transmission case. The inner lever 22 and associated components, including the actuator 14 and link arm 16, may be retained within the transmission case.

The parking override assembly 20 may additionally include an override lever 30 that may also be configured to pivot about the pivot axis 24. The override lever 30 may be configured to pivot between various positions, including a first position, which may be a "nominal" position for normal operation, and a second position, which may be an "override" position. The override lever 30 may be positioned outside the case for ease of access. The override lever 30 may be configured to pivot separately from the inner lever 22, such that as the inner lever 22 pivots between the "PARK" and "not PARK" positions during normal operation, the override lever 30 remains stationary.

The override lever 30 may be coupled with an actuating finger or arm 32, such that the override lever 30 and the actuating arm 32 may pivot together about the pivot axis 24. The actuating arm 32 may be retained within a transmission case. The actuating arm 32 may define a plane of pivoting motion that passes through the pin 28 of the inner lever 22. An extension spring 34 may be coupled to the actuating arm 32 and may bias the override lever 30 toward the nominal position.

The override lever 30 may also include a first fastener hole 36 and a second fastener hole 38. The second fastener hole 38 may be offset from the first fastener hole 36; for example, along a plane defined by a surface of the override lever 30. A fastener 40 may be provided for securing the override lever 30 to the transmission case. More particularly, the fastener 40 may be disposed through the first fastener hole 36 and to the transmission case to retain the override lever 30 in the nominal position.

To put the parking override assembly 20 into an override mode, the fastener 40 may be removed from the first fastener hole 36 and the override lever 30 may be pivoted away from the nominal position until the actuating arm 32 contacts the pin 28 and causes the inner lever 22 to also pivot. Pivoting the inner lever 22 may move the inner lever 22 from the "PARK" position to at least the "not PARK" position wherein the parking pawl 12 is disengaged. In this configuration, the vehicle is shifted out of PARK and may be moved from a current vehicle location. The fastener 40 may be inserted into the second fastener hole 38 to retain the override lever 30 in the override position, and thus maintain the inner lever 22 in the "not PARK" position.

In some approaches, a parking override assembly may include a fastener having a common head configuration, such as a hexagonal head configuration. Such common head configurations may be removed using conventional tools. Under some circumstances, it may be desirable to limit the ability to operate the parking override assembly. For example, it may be desirable to limit the ability to operate the parking override assembly to users having a given installation or uninstallation tool. In this way, the fastener 40 may be a security fastener having a head configuration operable with the given installation or uninstallation tool.

Figure 3A:
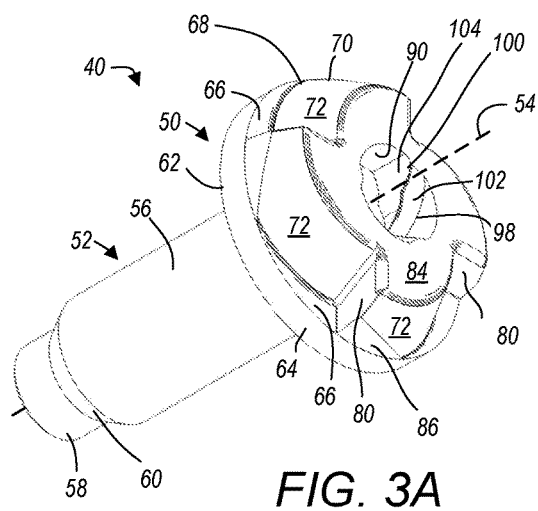
FIG. 3A is a perspective view of a fastener according to one approach.
Figure 3B:
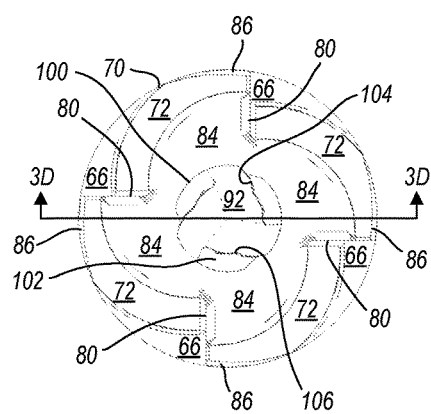
FIG. 3B is a top plan view of the fastener of FIG. 3A.
Figure 3C:
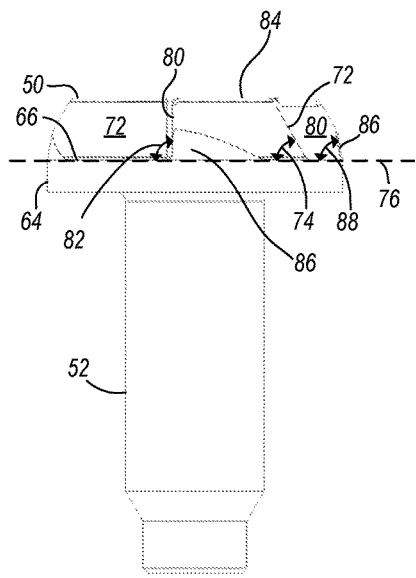
FIG. 3C is a side elevation view of the fastener of FIG. 3A.

Referring now to FIGS. 3A and 3B, a fastener 40 may include a head 50 and a shaft 52 extending along a longitudinal axis 54. The longitudinal axis 54 may be a central longitudinal axis extending through a central axis of the fastener 40. The fastener 40 may be formed, for example, of a metal or metal alloy such as steel (e.g., carbon steel), or other suitable material.

The shaft 52 may include an elongated portion 56 having a first diameter, a tip portion 58 having a second diameter different than the first diameter (e.g., smaller than the first diameter), and a tapered portion 60 disposed between the elongated portion 56 and the tip portion 58 and having an increasing or decreasing diameter along the longitudinal axis 54. In at least one approach, the elongated portion 56 may have an outer diameter of approximately 8 millimeters, and the tip portion 58 may have an outer diameter of approximately 6 millimeters.

The shaft 52 may have a longitudinal length in the range of approximately 15 millimeters and approximately 30 millimeters, and more particularly, approximately 17, 18, or 22 millimeters. In at least one approach, the tip portion 58 has a longitudinal length of approximately 3 millimeters.

The shaft 52 may be a threaded shaft or partially threaded shaft. For example, the shaft 52 may be an M8 metric ISO screw thread. At least a portion of the shaft 52 may be provided with a thread-locking feature, such as a coating or other application.

The head 50 may include a flange portion 62 defining an outer cylindrical surface 64 disposed circumferentially about the longitudinal axis 54. The outer cylindrical surface 64 may have a height (e.g., along the longitudinal axis 54) in the range of approximately 1 millimeter to approximately 3 millimeters, and more particularly, approximately 2 millimeters.

The flange portion 62 may define a radially-extreme outer diameter of the head 50; for example, along the outer cylindrical surface 64. The radially-extreme outer diameter of the head 50 may be, for example, in the range of approximately 10 to approximately 30 millimeters, and more particularly, approximately 17 millimeters.

The flange portion 62 may also define a planar surface 66 or generally planar surface disposed in a plane generally orthogonal to the longitudinal axis 54.

The head 50 may further include a unidirectional outer drive 68. The outer drive 68 may refer to a peripheral region of the head 50. The outer drive 68 may include at least one external or outer lobe 70, and in some approaches, a plurality of outer lobes 70. For example, as shown in the approach of FIGS. 3A-3D, the fastener 40 may include four outer lobes 70. As used herein, a lobe may be a feature extending at a height along the longitudinal axis 54, and having a ramp surface extending at an angle relative to a transverse plane and an abutment surface extending at a generally orthogonal angle relative to the transverse plane.

The outer lobes 70 may extend from the planar surface 66 in the direction of the longitudinal axis 54. For example, the outer lobes 70 may extend a height (e.g., along the longitudinal axis 54) in the range of approximately 2 millimeters to approximately 5 millimeters, and more particularly, approximately 3.5 millimeters. The outer lobes 70 may be curved outer lobes that generally extend along a curve about the longitudinal axis 54.

An outer lobe 70 may include an outer ramp surface 72. The outer ramp surface 72 may define a slope. The slope may define an angle 74 (shown in FIG. 3C) relative to a transverse plane 76 (which may be, for example, parallel to the planar surface 66). The angle 74 may be, for example, in the range of approximately 50 degrees and approximately 70 degrees, and more particularly, approximately 60 degrees.

In at least one approach, an outer ramp surface 72 curves (e.g., about the longitudinal axis 54) from a radially-extreme surface of the head to a radially intermediate portion of the head 50 (e.g., to an intermediate portion of the planar surface 66 of the flange portion 62). In at least one approach, an outer ramp surface 72 is the outermost surface of the head 50. More particularly, an outer ramp surface 72 may define the radially-extreme outer surface of the head 50 when the head 50 is viewed along a cross section parallel to the transverse plane 76 at the outer ramp surface 72.

An outer lobe 70 may also define an outer abutment surface 80. The outer abutment surface 80 may be a vertical abutment surface or generally vertical abutment surface relative to the transverse plane 76. For example, the outer abutment surface 80 may extend at an angle 82 (shown in FIG. 3C) of approximately 90 degrees relative to the transverse plane 76.

In at least one approach, a first outer abutment surface of a first outer lobe may be disposed in a first plane disposed generally orthogonal to the transverse plane 76. A second outer abutment surface of a second outer lobe disposed opposite the first outer lobe may be disposed in a second plane parallel to the first plane. The first and second planes may be offset such that the first and second planes are not coplanar.

An outer lobe 70 may also define a top surface 84. The top surface may be a horizontal top surface or a generally horizontal top surface relative to the transverse plane 76. For example, the top surface 84 may be parallel to, and longitudinally offset from, the transverse plane 76.

The outer ramp surface 72 of the outer lobe 70 may extend between lower and upper edges. More particularly, a lower edge may be disposed at or adjacent to the planar surface 66 of the head 50, and an upper edge may be disposed at or adjacent to the top surface 84. The lower and upper edges may be curved edges. In at least one approach, an upper edge has a different radius of curvature than the lower edge. For example, the lower edge may have a first radius of curvature. In at least one approach, the first radius of curvature is a value less than a value of the radius of curvature of the head 50. The upper edge may have a second radius of curvature value different than the first radius of curvature value. For example, the second radius of curvature value may be less than the first radius of curvature value.

An outer lobe 70 may have a generally constant height (e.g., along the longitudinal axis 54) along a clockwise sweep (with the top plan view of FIG. 3B as a reference) of the outer lobe 70. For example, a distance between the top surface 84 and a plane formed by the planar surface 66 may be the same adjacent the outer abutment surface 80 and a region of the outer lobe 70 opposite the outer abutment surface 80.

An outer lobe 70 may also define a side surface 86. The side surface 86 may define an angle 88 (shown in FIG. 3C) relative to a transverse plane 76. The angle 88 may be, for example, in the range of approximately 90 degrees and approximately 110 degrees, and more particularly, approximately 100 degrees.

An outer lobe 70 may also define an interior surface 90. The interior surface 90 may be a vertical inner surface or generally inner abutment surface relative to the transverse plane 76. The interior surfaces 90 may define an interior cavity between the outer lobes 70.

As shown, an outer lobe 70 may have a variable distance from the longitudinal axis 54. More particularly, a proximal edge of the outer abutment surface 80 or a distal edge of the top surface 84 of the outer lobe 70 may have a variable distance from the longitudinal axis 54. As used herein, a proximal edge refers to an edge relatively closest to the longitudinal axis 54, and a distal edge refers to an edge relatively farthest from the longitudinal axis 54. For example, at a region adjacent the outer abutment surface 80, the top surface 84 may be a first radial distance from longitudinal axis 54. This radial distance may decrease along a counter-clockwise sweep (with the top plan view of FIG. 3B as a reference) of the outer lobe 70 to a second radial distance less than the first radial distance.

Figure 3D:
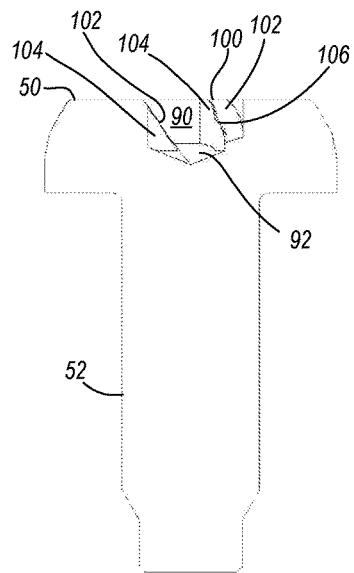
FIG. 3D is a cross section of the side elevation view of the fastener of FIG. 3C.

The head 50 may include a cavity floor 92 extending within the cavity. In at least one approach, the cavity floor 92 may be a sloped cavity floor such as a conically-shaped cavity floor, as shown in FIG. 3D. The slope may have an angle, for example, in the range of approximately 15 degrees and approximately 30 degrees relative to the transverse plane 76, and more particularly, approximately 22 degrees. In at least another approach, the cavity floor may be a horizontal cavity floor or a generally horizontal cavity floor relative to the transverse plane 76. For example, the cavity floor may be parallel to the transverse plane 76.

The head 50 may further include a unidirectional inner drive 98. The inner drive 98 may include at least one internal or inner lobe 100, and in some approaches, a plurality of inner lobes 100. For example, as shown in the approach of FIGS. 3A-3D, the fastener 40 may include three inner lobes 100. The inner lobes 100 may extend from the cavity floor 92 in the direction of the longitudinal axis 54, and may extend from the interior surfaces 90 of the outer lobes 70 toward the longitudinal axis 54. The inner lobes 100 may be curved inner lobes that generally extend along a curve about the longitudinal axis 54.

An inner lobe 100 may include an inner ramp surface 102. The inner ramp surface 102 may define a slope. The slope may define an angle relative to the transverse plane 76. The angle may be, for example, in the range of approximately 40 degrees and approximately 60 degrees, and more particularly, approximately 50 degrees.

An inner lobe 100 may also define an inner abutment surface 104. The inner abutment surface 104 may be a vertical abutment surface or generally vertical abutment surface relative to the transverse plane 76. For example, the inner abutment surface 104 may extend at an angle of approximately 90 degrees relative to the transverse plane 76.

The inner ramp surface 102 and the inner abutment surface 104 may define a protuberance 106 extending into the cavity. In this way, the inner abutment surface 104 may define two concave abutment wall surfaces, wherein the protuberance 106 separates the two concave abutment wall surfaces.

As shown, an inner lobe 100 may have a variable height (e.g., along the longitudinal axis 54) along a clockwise sweep (with the top plan view of FIG. 3B as a reference) of the outer lobe 70. More particularly, an inner lobe 100 may have a first height at a first region and a second height at a second region opposite the first region, the second height being less than the first height. For example, the height of the inner lobe 100 may decrease from a first height generally corresponding to a height of an outer lobe 70 to a second height adjacent the cavity floor 92.

As shown, the unidirectional inner drive 98 and the unidirectional outer drive 68 may be concentrically disposed about the longitudinal axis 54 of the fastener 40. The unidirectional outer drive 68 may have a larger outer diameter than the unidirectional inner drive 98.

The outer lobes 70 and inner lobes 100 provide for inverse unidirectional driving the of the fastener 40. As defined herein, unidirectional driving refers to an angular rotation of the fastener 40 in one direction (e.g., clockwise or counterclockwise) through contact with an abutment surface of a drive (e.g., inner drive 98 or outer drive 68), wherein angular rotation in the opposite direction is inhibited or substantially inhibited at that drive.

The inner lobes 100 may be provided with a geometry that provides for rotation of the fastener 40 in a clockwise direction (with the top plan view of FIG. 3B as a reference). More particularly, the inner abutment surfaces 104 of the inner lobes 100 may be engaged by an inner drive tool, which may drive the fastener 40 in the clockwise direction. Due at least in part to the inner ramp surface 102, rotation of the fastener 40 in the counterclockwise direction by the inner drive tool may be inhibited. In this way, the inner lobes 100 may provide for installation of the fastener 40 by an inner drive tool.

Similarly, but inversely, the outer lobes 70 may be provided with a geometry that provides for rotation of the fastener 40 in a counter-clockwise direction (with the top plan view of FIG. 3B as a reference). More particularly, the outer abutment surfaces 80 of the outer lobes 70 may be engaged by an outer drive tool, which may drive the fastener 40 in the counter-clockwise direction. Due at least in part to the outer ramp surface 72, rotation of the fastener 40 in the clockwise direction by the outer drive tool may be inhibited. In this way, the outer lobes 70 may provide for uninstallation of the fastener 40 by an outer drive tool.

In still another approach, the inner lobes 100 may be provided with a geometry that provides for rotation of the fastener 40 in a counter-clockwise direction (with the top plan view of FIG. 3B as a reference), and the outer lobes 70 may be provided with a geometry that provides for rotation of the fastener 40 in a clockwise direction. In this way, the outer lobes 70 may provide for installation of the fastener 40 by an outer drive tool, and the inner lobes 100 may provide for uninstallation of the fastener 40 by an inner drive tool.

Although shown as having four commonly-dimensioned and commonly-spaced outer lobes 70, the fastener 40 may be provided with other suitable configurations. For example, the fastener may be provided with three commonly-dimensioned and commonly-spaced outer lobes, five commonly-dimensioned and commonly-spaced outer lobes, six commonly-dimensioned and commonly-spaced outer lobes, eight commonly-dimensioned and commonly-spaced outer lobes, nine commonly-dimensioned and commonly-spaced outer lobes, or other suitable number of commonly-dimensioned and commonly-spaced outer lobes.

The fastener may also be provided with two commonly-dimensioned larger outer lobes and two commonly-dimensioned smaller outer lobes disposed between the larger outer lobes. The fastener may also be provided with two adjacent smaller outer lobes and one larger outer lobe. The fastener may also be provided with two smaller outer lobes and four larger outer lobes. The fastener may also be provided with two adjacent smaller outer lobes, two spaced apart medium outer lobes, and one larger outer lobe disposed between the medium outer lobes. The fastener may also be provided with various inner lobe configurations.

Referring now to FIGS. 4A and 4B, an inner drive tool 150 may include one or more inner drive tool ramp surfaces 152 and corresponding inner drive tool abutment surfaces 154. The ramp surfaces 152 and abutment surfaces 154 may be dimensioned such that when the inner drive tool 150 engages the fastener 40 within the cavity defined by the outer lobes 70 and the cavity floor 92, the ramp surfaces 152 of the inner drive tool 150 engage the inner ramp surfaces 102. The abutment surfaces 154 of the inner drive tool 150 may engage (or the inner drive tool 150 may be rotated in the clockwise direction to engage) the inner abutment surfaces 104 of the fastener 40. Rotation of the inner drive tool 150 in the clockwise direction may cause the abutment surfaces 154 of the inner drive tool 150 to rotate the fastener 40 in the clockwise direction. In this way, the inner drive tool 150 may be an "installation" tool. For example, the inner drive tool 150 may install the fastener 40 within a fastener hole of an override lever 30 to secure the override lever 30 in either a "PARK" position or "not PARK" position. Rotation of the inner drive tool 150 in the counter-clockwise direction may cause the ramp surfaces 152 of the inner drive tool 150 to slide along the inner ramp surfaces 102 of the fastener 40. In this way, rotation of the inner drive tool 150 in the counter-clockwise direction may have no effect on the rotational position of the fastener 40.

Referring now to FIGS. 5A and 5B, an outer drive tool 160 may include one or more outer drive tool ramp surfaces 162 and corresponding outer drive tool abutment surfaces 164. The outer ramp surfaces 162 and abutment surfaces 164 may be dimensioned such that when the outer drive tool 160 engages the fastener 40 about the radially-distal portions of the outer lobes 70, the ramp surfaces 162 of the outer drive tool 160 engage the outer ramp surfaces 72. The abutment surfaces 164 of the outer drive tool 160 may engage (or the outer drive tool 160 may be rotated in the counter-clockwise direction to engage) the outer abutment surfaces 80 of the fastener 40. Rotation of the outer drive tool 160 in the counter-clockwise direction may cause the abutment surfaces 164 of the outer drive tool 160 to rotate the fastener 40 in the counter-clockwise direction. In this way, the outer drive tool 160 may be an "uninstallation" tool. For example, the outer drive tool 160 may uninstall the fastener 40 from a fastener hole of an override lever 30 to allow a user to move the override lever 30 from a "PARK" position to a "not PARK" position, or vice-versa. Rotation of the outer drive tool 160 in the clockwise direction may cause the ramp surfaces 162 of the outer drive tool 160 to slide along the outer ramp surfaces 72 of the fastener 40. In this way, rotation of the outer drive tool 160 in the clockwise direction may have no effect on the rotational position of the fastener 40.

As discussed, in one non-limiting approach, the fasteners described herein may be used in a parking override assembly of a transmission. However, the fasteners may also or instead be used in other aspects of a vehicle. Furthermore, the fasteners may also be used in non-vehicular technologies.

In at least one approach, a plurality of fasteners may be provided. In at least one approach, a first fastener of the plurality of fasteners may have a first unidirectional outer drive (e.g., having four outer lobes), and a second fastener of the plurality of fasteners may have a second unidirectional outer drive different than the first unidirectional outer drive (e.g., having three outer lobes). Although the first and second fasteners may be provided with different unidirectional outer drives, the first and second fasteners may have common unidirectional internal drive. In this way, various fastener types may be installed using a common inner drive tool, but may require distinct outer drive tools to uninstall the fasteners.

While exemplary embodiments are described above, it is not intended that these embodiments describe all possible forms encompassed by the claims. The words used in the specification are words of description rather than limitation, and it is understood that various changes may be made without departing from the spirit and scope of the disclosure. As previously described, the features of various embodiments may be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:

1. A fastener having a head comprising:
   a unidirectional inner drive including an inner lobe having an inner ramp surface adjacent to an inner drive abutment surface receives a torque to effect only a clockwise rotation of the fastener; and
   a concentric unidirectional outer drive including an outer lobe having an outer ramp surface adjacent to an outer drive abutment surface receives an inverse torque to effect only a counter-clockwise rotation of the fastener.

2. The fastener of claim 1 wherein the inner lobe is a plurality of inner lobes.

3. The fastener of claim 2 wherein the plurality of inner lobes comprises three inner lobes.

4. The fastener of claim 1 wherein the outer lobe is a plurality of outer lobes.

5. The fastener of claim 4 wherein the plurality of outer lobes comprises four outer lobes.

6. The fastener of claim 1 wherein the unidirectional inner drive and the unidirectional outer drive are concentrically disposed about a longitudinal axis of the fastener.

7. The fastener of claim 6 wherein the inner drive abutment surface is a vertical inner drive abutment surface disposed in an inner vertical plane extending generally parallel to the longitudinal axis, and wherein the inner ramp surface is disposed in a plane angularly offset from the inner vertical plane.

8. The fastener of claim 6 wherein the outer drive abutment surface is a vertical outer drive abutment surface disposed in an outer vertical plane extending generally parallel to the longitudinal axis, and wherein the outer ramp surface is disposed in a plane angularly offset from the outer vertical plane.

9. The fastener of claim 1 wherein the unidirectional outer drive has a larger outer diameter than the unidirectional inner drive.

10. The fastener of claim 1 wherein the inner lobe is disposed within a cavity defined by interior walls of the outer lobe.

11. The fastener of claim 1 wherein the fastener is a plurality of fasteners, the plurality of fasteners comprising:
   a first fastener having:
      a first unidirectional inner drive a first set of inner lobes, wherein individual inner lobes of the first set of inner lobes have an inner ramp surface adjacent to an inner drive abutment surface receives a torque to effect only a clockwise rotation of the fastener; and
      a concentric first unidirectional outer drive including a first set of outer lobes, wherein individual outer lobes of the first set of outer lobes have an outer ramp surface adjacent to an outer drive abutment surface receives an inverse torque to effect only a counter-clockwise rotation of the fastener; and
   a second fastener having:
      a second unidirectional inner drive including a second set of inner lobes, wherein individual inner lobes of the second set of inner lobes have an inner ramp surface adjacent to an inner drive abutment surface receives a torque to effect only a clockwise rotation of the fastener, and wherein the second set of inner lobes the same number of inner lobes than the first set of inner lobes; and
      a concentric second unidirectional outer drive including a second set of outer lobes, wherein individual outer lobes of the second set of outer lobes have an outer ramp surface adjacent to an outer drive abutment surface receives an inverse torque to effect only a counter-clockwise rotation of the fastener, and wherein the second set of outer lobes has more outer lobes than the first set of outer lobes.

12. A fastener for a transmission having a pivotable override lever, comprising:
   a head including
   a flange defining a planar surface,
   a counter-clockwise unidirectional outer drive including four outer lobes having outer ramp surfaces extending obliquely from outer drive abutment surfaces and from side surfaces, and
   a clockwise unidirectional inner drive including three inner lobes disposed radially-internally of and extending from the outer drive, and having inner ramp surfaces.

13. The fastener of claim 12 wherein the inner ramp surfaces and the outer ramp surfaces are concentrically curved about a common axis.

14. The fastener of claim 12 wherein the outer drive is radially offset from the inner drive.

15. The fastener of claim 12 wherein the outer drive abutment surfaces include a first pair of offset parallel planar abutment surfaces and a second pair of offset parallel planar abutment surfaces.

16. The fastener of claim 15 wherein the first pair of offset parallel planar abutment surfaces extend in a first set of planes, wherein the second pair of offset parallel planar abutment surfaces extend in a second set of planes, and wherein the first set of planes are orthogonal to the second set of planes.

* * * * *